July 10, 1934.  R. W. SOHL  1,966,397
PNEUMATIC TIRE AND METHOD OF MAKING SAME
Filed Oct. 28, 1931
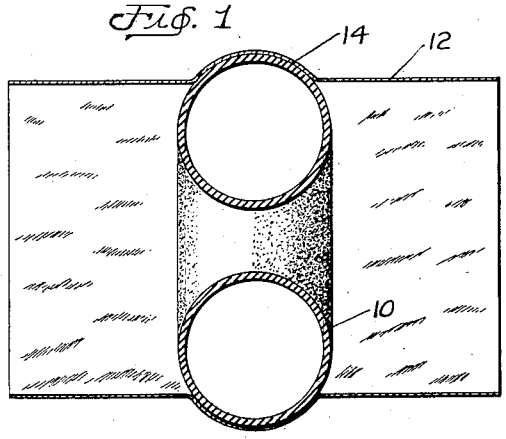
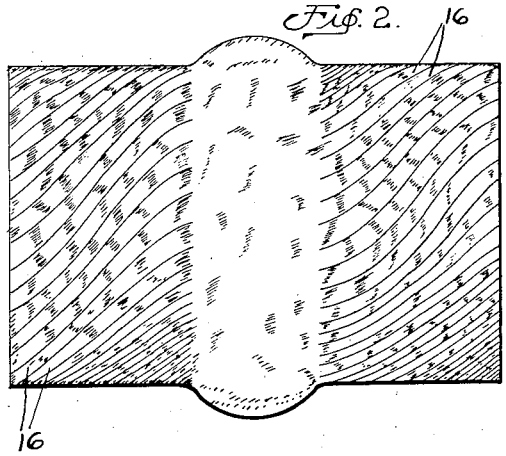
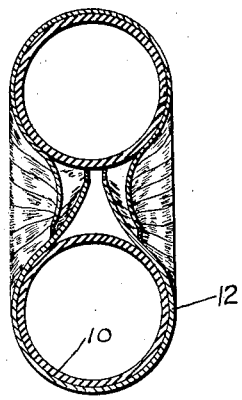
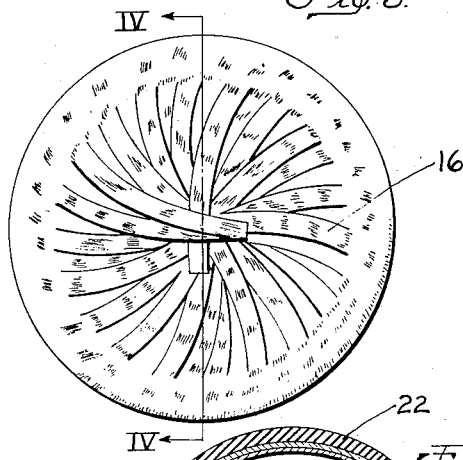
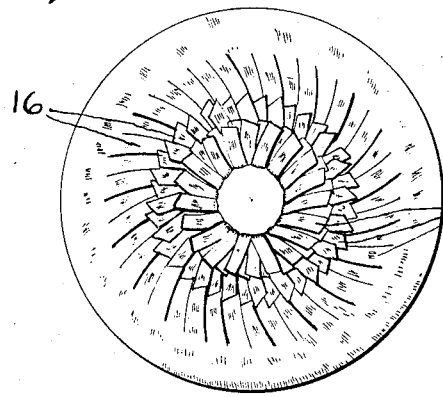
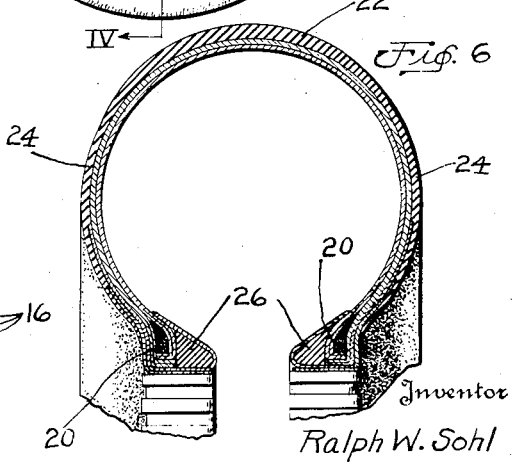
Inventor
Ralph W. Sohl
Attorney Patented July 10, 1934

1,966,397

UNITED STATES PATENT OFFICE 1,966,397

PNEUMATIC TIRE AND METHOD OF MAKING SAME

Ralph W. Sohl, Akron, Ohio, assignor to Wingfoot Corporation, Wilmington, Del., a corporation of Delaware Application October 28, 1931, Serial No. 571,509

2 Claims. (Cl. 154—14)

The present invention relates to pneumatic tires and methods of building the same, and more particularly to low-pressure pneumatic tires having large cross-sectional dimensions and relatively small bead diameters.

Heretofore, in the construction of pneumatic tires having large cross-sectional areas and small bead diameters, such as "doughnut" tires for use in airplanes and land vehicles, considerable difficulty has been experienced in forming the tire carcasses of even, uniform strength. If the ordinary flat band methods are employed in building tires of this type, the subsequent expansion or blow-up of the flat tire carcass to the toroidal shape causes the cord count at the tread portion of the tire to be substantially diminished, and at times the cords are broken, due to the very large distance through which the tire carcass must be expanded. Again, if the older core-built method is used for making "doughnut" tires, the plies, when stitched down from the comparatively large tread diameter to the small bead diameter, will pucker and bunch up around the beads, giving very unsatisfactory results.

It is an object of the present invention to avoid and overcome the foregoing and other difficulties and undesirable features of prior art methods, and to provide a process for building "doughnut" tires, wherein the carcasses are of very uniform strength, and in which the cords and plies lie smoothly in proper relation to each other, resulting in a greatly improved product.

Another object of the invention is to provide a pneumatic tire of the "doughnut" type, wherein the various cords and plies lie in smooth relation to each other without bunching.

Another object of the invention is to provide a pneumatic tire, wherein the marginal edge portions of the plies comprising the tire carcass are split to form a plurality of strips or tapes which are stitched down to the proper position, so that the cords will lie in smooth relation to each other, giving, in effect, a reinforced sidewall free from shirring, and in which all of the cords are so related as to facilitate a uniform load distribution.

Another object of the invention is to provide a rapid, efficient and practical method of producing a low-pressure pneumatic tire having superior wear-resisting and load-sustaining qualities.

For a better understanding of the invention, reference may now be had to the accompanying drawing, wherein Fig. 1 is a diametrical, cross-sectional view through a tire carcass and building form of one type during the initial stages of the building operation;

Fig. 2 is an elevation of the partially built tire shown in Fig. 1, illustrating the next step in the building process;

Fig. 3 is a side elevation of the tire comprising the present invention, illustrative of the same in an intermediate stage of the building operation;

Fig. 4 is a diametrical, cross-sectional view taken on line IV—IV of Fig. 3;

Fig. 5 is a side elevation similar to Fig. 3 of the tire carcass in a further stage of the building process; and Fig. 6 is a large cross-sectional view through the completed tire, with the tread and sidewall portions thereon.

It will be understood that the present invention is particularly adapted for the building of pneumatic tires of the "doughnut" type having relatively large overall and cross-sectional diameters, and a small bead diameter. However, it will be appreciated that the principles of the invention are broadly applicable to the building of pneumatic tires of all types and sizes. In practicing the method, a suitable core or drum is provided, upon which the carcass is built, and while this core may take the form of a fusible or destructible core of paper, low-melting alloy, collapsible drum or the like, it has been shown in the drawing as comprising an inflatable, annular former or tube 10 of resilient rubber. This core 10 may, or may not be supported upon a suitable chuck or axle (not shown) during the building operations as may be found convenient or desirable.

The first ply 12 of the tire carcass is applied to the tube 10 in the manner illustrated in the drawing. In order to assist in applying the ply 12 to the tube 10, the outer periphery of the tube may be coated with a suitable cement. It will be seen that the ply 12 contacts with the tube 10 throughout the tread portion of the tube, as indicated at 14, and has its marginal edges extending out on both sides of the tube 10 in the form of hollow cylinders. The ply 12 can be of any suitable material, such as woven fabric, cord fabric, or the like, but preferably is of pickless cord fabric of known type. As is usual in the tire building art, the cords of the plies will preferably be cut on a bias.

The next step is to slit the projecting edges of the first ply into a plurality of relatively narrow strips 16, which are formed by cutting or slitting the fabric back to where it contacts with the tube 110

10, as best shown in Fig. 2. This operation is very readily accomplished when pickless cord fabric is employed, in that the bias-cut cords are held together only by the rubber coating thereon and can be easily separated into strips on lines parallel to the direction in which the cords extend.

The strips 16 are now successively folded radially inward upon the sidewalls of the tube 10 so that each strip as it is laid will partially overlap the preceding strip, and at the same time will lay smooth and flat with respect thereto. The ends of the strips 16 are left extending into the central portion of the tube 10 in the manner illustrated in Figs. 3 and 4, any number of other plies being now applied over the first ply, with or without the aid of a suitable bonding cement. The overlapping of the successive strips 16 makes possible a smooth lay of the cords without gathering or shirring in the sidewalls of the tire, and this facilitates uniform distribution of load on the cords when the tire is in use.

After the ply or plies are positioned as above described, the beads 20 are placed in the tire carcass, such beads comprising small bundles of wires, or any other inextensible means, if desired. As an alternative, the main strength of the bead portion of the carcass may be dependent upon the somewhat thicker portion of the carcass formed by the overlapping of the strips 16, in which case the non-extensible metallic beads previously referred to are not used. However, regardless of the particular type of bead used, the ends of the various strips 16 may now be folded back against the tire carcass in the manner illustrated in Fig. 5. This is accomplished by folding the ends of the outermost ply back over the bead first and down against the tire sidewall in offset, overlapping relation, and thereafter similarly folding the ends of the remaining plies back in turn. The bead portions of the tire are thus very firmly bonded into the tire carcass, and furthermore, the sidewalls of the tire carcass are built up and strengthened by the added material therein given by the folding back of the ends of the strips 16.

It will be understood that in certain instances the beads of the tire can be covered with the usual flipper strips, and that in such a construction, the strips 16 need not necessarily be folded around the beads, but can be of such length as to extend only down to the inner portion of the bead. While such a construction would be entirely practical, the illustrated embodiment is preferred because of the desirable added strength given to the tire carcass by actually folding the strips around the beads and back against the tire sidewalls.

A tread 22 and sidewall covers 24 are next applied to the tire carcass, and if desired, gum toes 26 may be added to the beads of the tire, as shown in Fig. 6. After the building operations have been completed, as above explained, the tire carcass may be removed from the tube 10, as by the deflation of the tube, and placed in a mold and vulcanized in any ordinary or preferred manner. In certain instances, the tube 10 may be left inside the tire carcass, either to be used as an airbag during vulcanization, or actually to form a permanent internal lining of rubber within the completed tire.

From the foregoing it will be apparent that a method has been provided for building tires of large cross-sectional dimensions and small bead diameters, and wherein the cords lie in relatively flat, unbunched relation to each other, and in which, furthermore, the cord count in the fabric is substantially the same at the bead portion of the tire as at the tread portion. A tire carcass is formed with reinforced sidewalls adjacent the beads, whereby the stresses imposed upon the tire are more readily distributed and absorbed. This additional strengthening of the sidewalls and bead portions of the tire is particularly desirable in "doughnut" tires, inasmuch as the tire-supporting means is relatively small, as a result of which the stresses imposed upon the portions of the tire adjacent the hub or mounting rim are relatively greater per unit area.

Obviously, the various features of the improved tire, and the steps in the method of its manufacture, can be widely varied, as desired. For example, the extent of contact of the plies at 14 with the supporting tube or form 10 may be increased or decreased to meet the requirements of a particular tire design. Also the length of the slits defining the strips 16 may be varied to give the proper degree of overlap in the sidewalls of the tire. Again, the strips 16 may be of any predetermined width, dependent upon the type and size of the tire. Thus, in some instances, the strips may be relatively wide without bunching the cords, whereas in other cases the best results may be attained from using somewhat narrower strips.

Although I have illustrated only one embodiment of my invention, and have described that form in detail, it will be apparent to those skilled in the art that the invention is not so limited but that various modifications may be made therein without departing from the spirit of the invention or from the scope of the appended claims.

What I claim is:

1. The method of making super-balloon tires which consists in providing an inflatable form, wrapping a ply of rubberized fabric over the form, slitting the sides of the ply into strips, folding the strips over each other and in against the side of the form in overlapping, offset relation, applying a second ply of greater width to form longer strips in a similar manner to the form over the first ply, applying means to define beads on the sides of the tire, folding the longer strips of the outermost ply back over the beads, folding the shorter strips of the innermost ply around the beads and up on the longer strips of the outer ply already laid against the tire carcass, applying the tread and side-walls upon the tire carcass and thereafter deflating and removing the form.

2. A pneumatic tire comprising beads and a plurality of plies, said plies having the sides thereof slit into a plurality of strips but having the center portion of each ply of one piece and unslit, the strips being wrapped around the beads and back against the tire carcass, the strips of the innermost ply lying on the outside of the tire carcass after they have been wrapped around the beads, the strips of the outermost ply extending around the beads between the strips of the innermost ply and the beads, said outer ply strips being longer than the inner ply strips and thus extending radially outwardly beyond the ends of the inner ply strips.

RALPH W. SOHL.